United States Patent
Xu et al.

(10) Patent No.: US 9,565,653 B2
(45) Date of Patent: Feb. 7, 2017

(54) APPARATUS AND METHOD FOR MULTIPLE PAGINGS IN BROADBAND WIRELESS COMMUNICATION SYSTEM

(71) Applicant: Samsung Electronics Co., Ltd., Suwon-si, Gyeonggi-do (KR)

(72) Inventors: Mingxia Xu, Suwon-si (KR); Hee-Won Kang, Seongnam-si (KR); Hyun-Jeong Kang, Seoul (KR); Byung-Wook Jun, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 169 days.

(21) Appl. No.: 14/246,644

(22) Filed: Apr. 7, 2014

(65) Prior Publication Data

US 2014/0221024 A1    Aug. 7, 2014

Related U.S. Application Data

(63) Continuation of application No. 13/042,927, filed on Mar. 8, 2011, now Pat. No. 8,712,449.

(30) Foreign Application Priority Data

Mar. 12, 2010 (KR) .................. 10-2010-0022419

(51) Int. Cl.
*H04W 68/00* (2009.01)
*H04W 68/02* (2009.01)

(52) U.S. Cl.
CPC ............. *H04W 68/02* (2013.01); *H04W 68/00* (2013.01)

(58) Field of Classification Search
None
See application file for complete search history.

(56) References Cited

U.S. PATENT DOCUMENTS

| | | |
|---|---|---|
| 6,144,653 A | 11/2000 | Persson et al. |
| 2005/0148348 A1 | 7/2005 | Cramby et al. |
| 2006/0025134 A1 | 2/2006 | Cho et al. |
| 2006/0194598 A1 | 8/2006 | Kim et al. |
| 2007/0099635 A1 | 5/2007 | Mohanty et al. |
| 2007/0259699 A1* | 11/2007 | Homchaudhuri . H04W 52/0216 455/574 |
| 2008/0254814 A1 | 10/2008 | Harris et al. |
| 2009/0280848 A1 | 11/2009 | Park et al. |
| 2009/0310503 A1 | 12/2009 | Tenny et al. |

(Continued)

FOREIGN PATENT DOCUMENTS

| | | |
|---|---|---|
| KR | 10-2009-0117572 A | 11/2009 |
| KR | 10-2009-0130373 A | 12/2009 |

*Primary Examiner* — Daniel Lai
(74) *Attorney, Agent, or Firm* — Jefferson IP Law, LLP

(57) ABSTRACT

An apparatus and method for operating a paging control in a broadband wireless communication system are provided. The method includes receiving paging information used to determine a location of a paging listening interval in an idle mode, determining whether multiple pagings are applied, using a maximum paging number field contained in the paging information, determining locations of a plurality of paging listening intervals in a paging cycle using a paging spacing value and an initial paging offset contained in the paging information, and determining whether the terminal is paged in each of the paging listening intervals.

43 Claims, 6 Drawing Sheets

(56) References Cited

U.S. PATENT DOCUMENTS

| | | | |
|---|---|---|---|
| 2010/0004001 A1* | 1/2010 | Tao | H04W 28/06 455/456.1 |
| 2010/0159929 A1* | 6/2010 | Homchaudhuri | H04W 68/02 455/436 |
| 2010/0240420 A1* | 9/2010 | Chin | H04W 68/02 455/574 |
| 2010/0317374 A1 | 12/2010 | Alpert et al. | |

* cited by examiner

APPARATUS AND METHOD FOR MULTIPLE PAGINGS IN BROADBAND WIRELESS COMMUNICATION SYSTEM

PRIORITY

This application is a continuation application of U.S. patent application Ser. No. 13/042,927, filed on Mar. 8, 2011, which claims the benefit under 35 U.S.C. §119(a) of a Korean patent application filed in the Korean Intellectual Property Office on Mar. 12, 2010 and assigned Serial No. 10-2010-0022419, the entire disclosure of which is hereby incorporated by reference.

BACKGROUND OF THE INVENTION

1. Field of the Invention

The present invention relates to a broadband wireless communication system. More particularly, the present invention relates to an apparatus and a method for performing a plurality of pagings within one paging cycle in a broadband wireless communication system.

2. Description of the Related Art

The Institute of Electrical and Electronics Engineers (IEEE) 802.16m standard which is considered as a next-generation wireless communication system defines an idle mode to reduce power consumption of a terminal. In the idle mode, which is one of operation modes of the terminal, the terminal does not transmit and receive traffic at all. Accordingly, when downlink traffic of the idle terminal takes place, a control signaling for informing of the downlink traffic must precede. The informing of the downlink traffic through the control signaling is referred to as paging. The paging is carried out by a paging group allocated to a corresponding terminal. The paging group is a paging range including a plurality of base stations. When the paging is conducted on a single terminal, the base stations in the paging group allocated to the terminal transmit a paging message.

One terminal can be assigned a plurality of paging groups. When the downlink traffic to the idle terminal takes place or location update should occur, the system pages the terminal using the paging group of a highest rank. When there is no response from the terminal within a certain time interval, the system pages through the paging group of a next rank. As a result, the paging time through the paging group conforms to a paging offset defined individually with respect to each paging group. Paging parameters including the paging group, a paging cycle, and a paging offset are transmitted to the terminal using a DeREGistration-ReSPonse (DREG-RSP) message or a RaNGing-ReSPonse (RNG-RSP) message in case of an idle mode entry or the location update of the terminal.

Meanwhile, the IEEE 802.16m standard is recently provided Machine-to-Machine (M2M) application support. The M2M application supports communication between devices or between a device and a server over a wireless communication network without user's intervention. Adoption of the M2M application allows various scenarios such as smart grid and smart metering. According to the M2M application, the traffic can take place on a time, day, or month basis and good power saving technologies for a communication module are desired. Hence, a longer paging cycle than the predefined paging cycle has been introduced. However, when the paging cycle is increased, the power consumption of the communication module can be reduced. Yet, when the reception of the paging message fails, it may not be possible to receive the paging message until the next paging time. As a result, a paging delay is extended.

SUMMARY OF THE INVENTION

An aspect of the present invention is to address at least the above-mentioned problems and/or disadvantages and to provide at least the advantages described below. Accordingly, an aspect of the present invention is to provide an apparatus and a method for preventing a paging delay from increasing in a broadband wireless communication system.

Another aspect of the present invention is to provide an apparatus and a method for conducting a plurality of pagings during one paging cycle in a broadband wireless communication system.

Yet another aspect of the present invention is to provide an apparatus and a method for conducting a plurality of pagings during one cycle using one paging group in a broadband wireless communication system.

Still another aspect of the present invention is to provide an apparatus and a method for conducting a plurality of pagings during one cycle using a plurality of paging groups in a broadband wireless communication system.

A further aspect of the present invention is to provide an apparatus and a method for determining a paging offset of a plurality of paging groups in a broadband wireless communication system.

Yet, a further aspect of the present invention is to provide an apparatus and a method for transmitting paging offset information of a plurality of paging groups in a broadband wireless communication system.

In accordance with an aspect of the present invention, a method for operating a terminal in a broadband wireless communication system is provided. The method includes receiving paging information used to determine a location of a paging listening interval in an idle mode, determining whether multiple pagings are applied, using a maximum paging number field contained in the paging information, determining locations of a plurality of paging listening intervals in a paging cycle using a paging spacing value and an initial paging offset contained in the paging information, and determining whether the terminal is paged in each of the paging listening intervals.

In accordance with another aspect of the present invention, a method for operating a paging control in a broadband wireless communication system is provided. The method includes transmitting paging information used for a terminal operating in an idle mode to determine a location of a paging listening interval, determining locations of a plurality of paging listening intervals in a paging cycle using a paging spacing value and an initial paging offset contained in the paging information, and determining whether the paging should occur in each of the paging listening intervals, and paging the terminal when the paging should occur.

In accordance with yet another aspect of the present invention, an apparatus of a terminal in a broadband wireless communication system is provided. The apparatus includes a modem for receiving paging information used to determine a location of a paging listening interval in an idle mode, and a controller for determining whether multiple pagings are applied, using a maximum paging number field contained in the paging information, for determining locations of a plurality of paging listening intervals in a paging cycle using a paging spacing value and an initial paging offset contained in the paging information, and for determining whether the terminal is paged in each of the paging listening intervals.

In accordance with still another aspect of the present invention, an apparatus of a paging control in a broadband wireless communication system is provided. The apparatus includes a communication unit for transmitting paging information used for a terminal operating in an idle mode to determine a location of a paging listening interval, and a controller for determining locations of a plurality of paging listening intervals in a paging cycle using a paging spacing value and an initial paging offset contained in the paging information, for determining whether the paging should occur in each of the paging listening intervals, and for paging the terminal when the paging should occur.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Exemplary embodiments of the present invention provide a method for conducting a plurality of pagings using a single paging group or a plurality of paging groups during one cycle in a broadband wireless communication system. Hereinafter, an Orthogonal Frequency Division Multiplexing (OFDM)/Orthogonal Frequency Division Multiple Access (OFDMA) wireless communication system is exemplified. However, the exemplary embodiments of the present invention are not limited thereto and may be equally applicable to other wireless communication systems.

Figure 1:
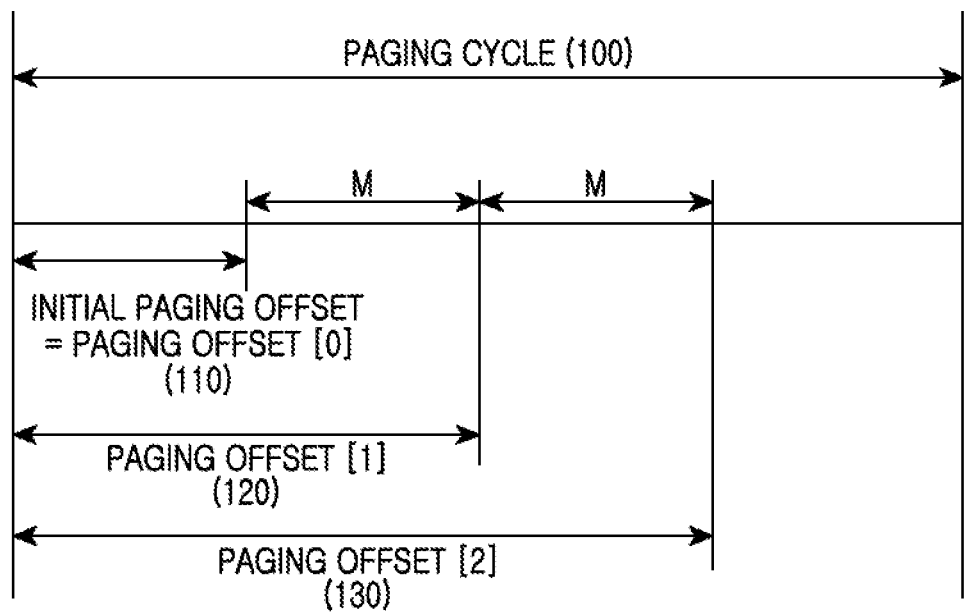
FIG. 1 illustrates paging offset distribution for multiple pagings in a broadband wireless communication system according to an exemplary embodiment of the present invention.

FIG. 1 illustrates paging offset distribution for multiple pagings in a broadband wireless communication system according to an exemplary embodiment of the present invention.

Referring to FIG. 1, a plurality of pagings can be carried out within a paging cycle 100. The paging cycle 100 includes one or more paging listening intervals and one or more paging unavailable intervals. During the paging cycle 100, a single paging or multiple pagings are performed. In the paging listening interval, a terminal attempts to decode a paging message received from a preferred base station. The preferred base station is selected by the terminal according to a preset basis. The preferred base station may be changed according to the determination of the terminal in the paging unavailable interval. For example, the preferred base station may be the base station that has the best channel status with the terminal.

FIG. 1 depicts three pagings per cycle. The three pagings can be fulfilled through three paging groups or through the single paging group. Hereinafter, the multiple pagings performed by different paging groups are referred to as multiple paging group allocation, and the multiple pagings performed by the single paging group are referred to as single paging group allocation. According to the multiple paging group allocation, each paging is conducted in the listening interval of the corresponding paging group and the listening interval is located at the point indicated by an offset of the corresponding paging group. As illustrated in FIG. 1, the initial paging offset, that is, a gap between a paging offset [0] 110 and a paging offset [1] 120 is M, and the gap between the paging offset [1] 120 and a paging offset [2] 130 is M. That is, the gap between the offsets of the adjacent pagings is M. According to the single paging group allocation, the gap between the paging offsets can be the same as described in FIG. 1. In other words, in the multiple paging group allocation, the paging offset [1] 120 indicates the paging listening interval of the first paging group. In the single paging group allocation, the paging offset [1] 120 indicates the first listening interval of the single paging group.

The paging offsets 110, 120 and 130 are defined based on Equation 1.

$$\text{Paging\_Offset}[i] = \text{Initial\_Paging\_Offset} + i \times M \; (i=0, \ldots, N\_\text{paging}-1) \qquad \text{Equation (1)}$$

In Equation 1, Paging_Offset[i] denotes the paging offset of an i-th paging, Initial_Paging_Offset denotes an initial paging offset, that is, the 0-th paging offset, M denotes paging spacing, and N_paging denotes a maximum paging number.

It is advantageous that the spacing between the pagings is set to a fixed time interval long enough that the base station pages the terminal in the corresponding interval, confirms the response from the terminal which successfully receives the paging message, and determines whether to conduct the next paging. Herein, the response indicates a network re-entry attempt or a location update attempt. The paging offset and the paging spacing are determined to satisfy Equation 2.

$$\text{Paging\_Offset}[N\_paging-1]+M \leq \text{Paging\_Cycle} \quad \text{Equation (2)}$$

In Equation 2, Paging_Offset[N_paging-1] denotes the paging offset of the last paging, M denotes the paging spacing, and Paging_Cycle denotes a length of the paging cycle.

The location of the i-th paging listening interval in the multiple paging group allocation and the location of the 0-th paging listening interval in the single paging group allocation are defined based on Equation 3.

$$N_{superframe}\% \text{PAGING\_CYCLE} = \text{INITIAL\_PAGING\_OFFSET} + i \times M$$
$$(i=0, \ldots, NP) \quad \text{Equation (3)}$$

In Equation 3, $N_{superframe}$ denotes a superframe number of a superframe including the i-th paging listening interval, PAGING_CYCLE denotes the length of the paging cycle, INITIAL_PAGING_OFFSET denotes the initial paging offset, M denotes the paging spacing, and NP denotes the maximum paging number.

The location of the i-th paging listening interval in the single paging group allocation is defined based on Equation 4. Equation 4 is applicable to the multiple paging group allocation as well.

$$PLI[i+1] = PLI[i] + M \ (i=0, \ldots, NP) \quad \text{Equation (4)}$$

In Equation 4, PLI[i] denotes the location of the i-th paging listening interval, M denotes the paging spacing, and NP denotes the maximum paging number.

The paging cycle Paging_Cycle, the initial paging offset N_paging, and the number of the pagings Paging_Cycle are transmitted to the terminal through a control message in case of an idle mode entry or the location update. Hereinafter, the information including the paging cycle Initial_Paging_Offset, the initial paging offset, and the number of the pagings is referred to as paging information for convenience of understanding.

The paging spacing is contained in the paging information and may be delivered by the control message in the idle mode entry or the location update. Alternatively, the paging spacing may be transmitted through a negotiation capability procedure in a network entry. At this time, the initial paging offset can be delivered through the negotiation capability procedure, rather than being carried by the paging information. For instance, at least one of the paging spacing and the initial paging offset may be determined by a Subscriber station Basic Capability-REQuest/ReSPonse (SBC-REQ/RSP) message for a negotiation capability procedure. Alternatively, the paging spacing may be modified by a separate negotiation after the network entry. In the idle mode entry or the location update, the paging spacing may be modified through a separate negotiation procedure.

For example, the paging information format is shown in Table 1.

TABLE 1

| name | note |
|---|---|
| paging cycle | |
| initial paging offset | |
| paging type indicator | 1: multiple pagings with the single paging group |
| | 0: multiple pagings with the multiple paging groups |
| Number of Paging (NP) | |
| paging group IDentification (ID) | ID of the primary paging group when the paging type indicator is 0. |
| deregistration identifier | |
| if(paging group type indicator == 0 ){ | |
|    for(i=1; i<NP; i++){ | |
|      paging group ID | ID of the secondary paging group when the paging type indicator is 0. |
|      deregistration identifier | |
|    } | |
| } | |

The paging information of Table 1 can be contained in a DeREGistration (DREG)-RSP message used in the idle mode entry or the RNG-RSP message used in the location update. That is, the paging information can be carried by one of the messages to the terminal which enters the idle mode or updates the location.

In Table 1, the paging information can include fields, such as a Paging Cycle, an Initial Paging Offset, a Paging Type Indicator, a Number of Paging, a Paging Group ID, and a Deregistration ID. The Paging Cycle field indicates the length of the paging cycle. The Initial Paging Offset field represents the start of the first paging listening interval using a start point of the paging cycle and the spacing of the first paging listening interval in the paging cycle. The Paging Type Indicator field indicates the paging type. The paging type is classified to the multiple paging group allocation and the single paging group allocation. For example, when the Paging Type Indicator field is set to 1, a paging control pages the terminal in a particular paging group and retries the paging with the same paging group in the next paging offset when a response is not received during a preset time. When the Paging Type Indicator field is set to zero, the paging control pages the terminal in a particular paging group and retries the paging at the next paging offset time in the next paging group when a response is not received during the preset time. The Number of Paging field indicates the maximum number of the available pagings during one paging cycle. When the Paging Type Indicator field is set to 1, the Number of Paging indicates the maximum number of the available pagings for the terminal in the single paging group allocated to one terminal. When the Paging Type Indicator field is set to zero, the Number of Paging is equal to the number of the multiple paging groups allocated to the terminal, and indicates the maximum available pagings while changing the paging groups within one paging cycle. The Paging Group ID field indicates an initial paging group ID allocated to the terminal. The Deregistration ID field indicates ID information of the idle terminal and is uniquely allocated in each paging group.

Operations and structure of the terminal and the paging control for the paging as described above are elucidated below.

Figure 2A:
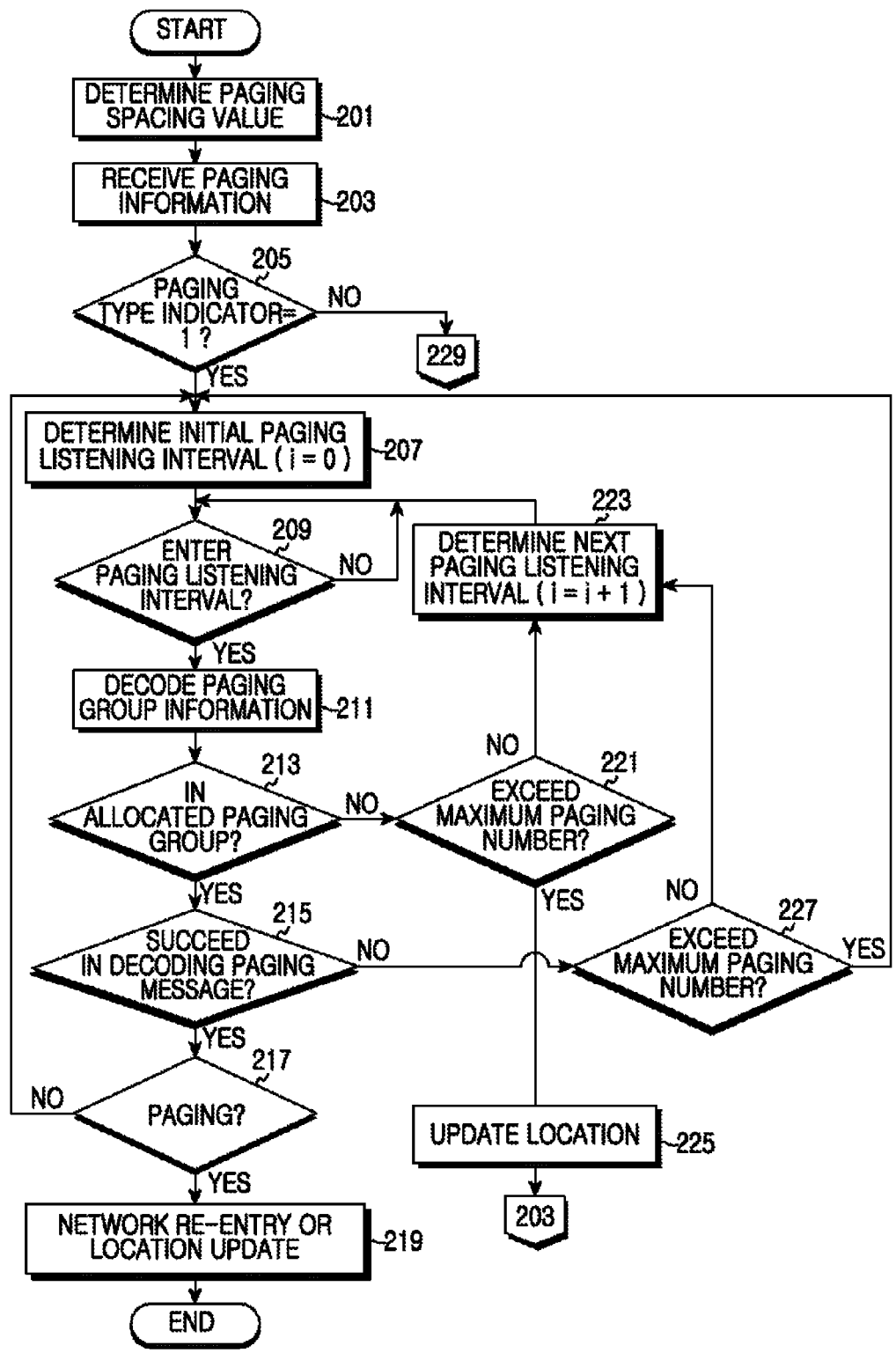
FIGS. 2A and 2B illustrate operations of a terminal in a broadband wireless communication system according to an exemplary embodiment of the present invention.
Figure 2B:
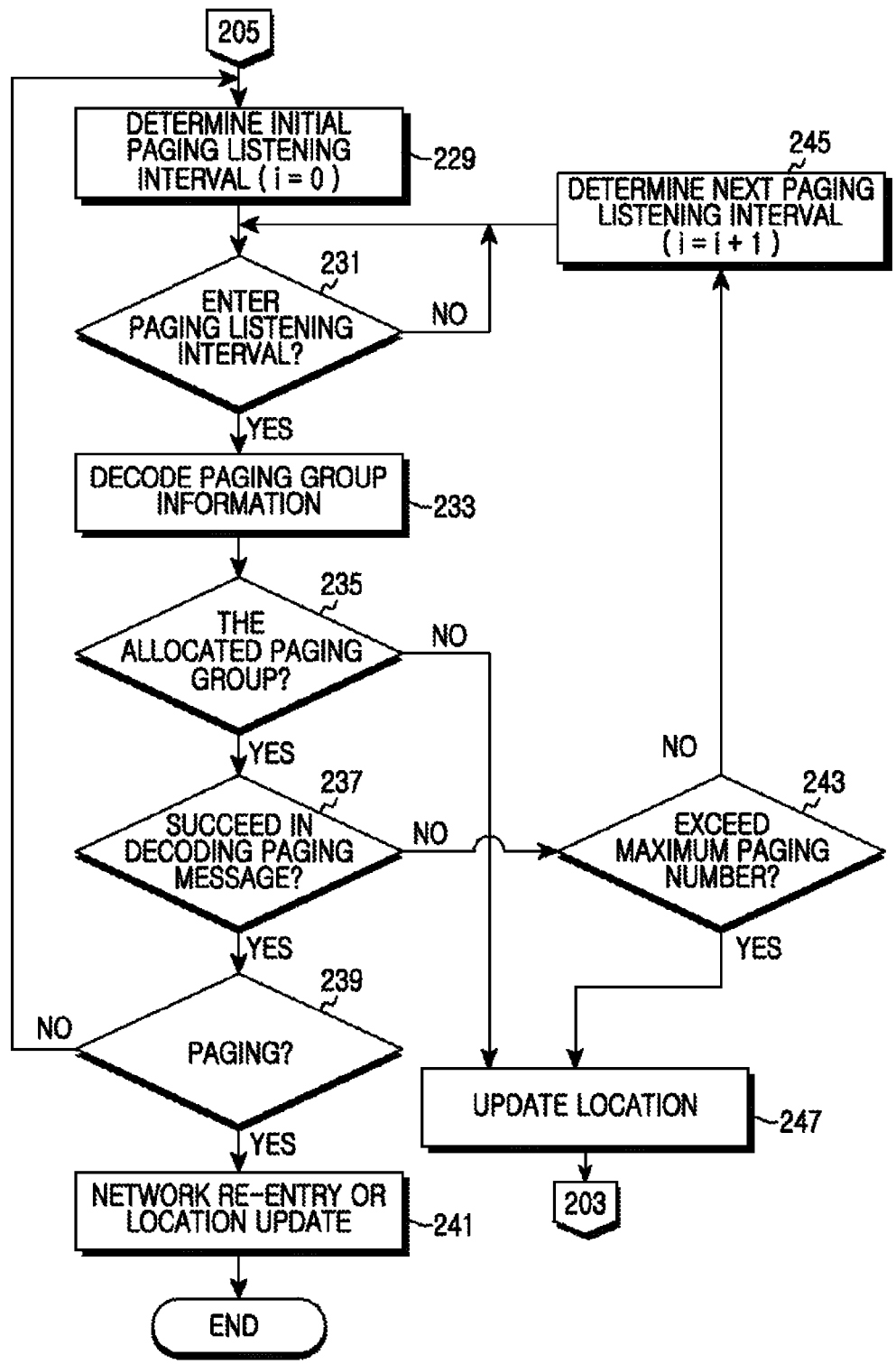

FIGS. 2A and 2B illustrate operations of a terminal in a broadband wireless communication system according to an exemplary embodiment of the present invention.

Referring to FIGS. 2A and 2B, the terminal determines a paging spacing value in step 201. The paging spacing indicates an offset difference between adjacent pagings when a plurality of the pagings is conducted in one cycle. The paging spacing value may be determined through a capability negotiation procedure when the terminal enters a network. The terminal transmits a request message including the intended paging spacing value, and receives the determined paging spacing value from the system through a response message. The paging spacing value can be modified through separate signaling after the network entry, which is not illustrated in FIGS. 2A and 2B.

In step 203, the terminal receives the paging information. The paging information, which is control information used to determine the location of the paging listening interval in the idle mode, can be received when the terminal enters the idle mode or when the terminal updates the location after the idle mode entry. The terminal can enter the idle mode before step 203 or in the step 203, which is not illustrated in FIGS. 2A and 2B. Herein, the paging information can include the parameters as shown in Table 1. In addition, the paging information can include the paging spacing value.

Upon receiving the paging information, the terminal determines whether the paging type indicator in the paging information is '1' in step 205. The paging type indicator is the parameter indicating a multiple paging group allocation or a single paging group allocation. The paging type indicator '1' indicates the multiple paging group allocation and '0' indicates the single paging group allocation. Herein, the correspondence between the paging type indicator value and the multiple/single paging group allocation may vary.

If it is determined that the paging type indicator indicates the multiple paging group allocation, the terminal determines the initial paging listening interval using the paging information in step 207. Herein, the initial paging listening interval indicates the paging listening interval of a top-rank paging group. That is, the terminal determines the initial paging listening interval using the paging cycle and the paging offset of the initial paging group. For example, the location of the initial paging listening interval is represented as a superframe number and determined based on Equation 3.

In step 209, the terminal determines whether to enter the paging listening interval. More specifically, the terminal determines whether the current superframe number is equal to the superframe number corresponding to the paging listening interval determined in step 207 or step 223. Until the paging listening interval is entered, the terminal minimizes its power consumption and performs no operation at all. Yet, the terminal can scan its neighbor base stations or select a preferred base station.

Entering the paging listening interval, the terminal decodes the paging group information received from the preferred base station in step 211. The paging group information, which informs of at least one paging group of the corresponding base station, is at a preset location in the superframe and includes at least one paging group ID. Accordingly, after obtaining the superframe synchronization, the terminal decodes the paging group information from the signal received over the preset location. By decoding the paging group information, the terminal can locate the current paging group.

In step 213, the terminal determines whether the ID of the paging group allocated to itself is contained in the paging group information. In other words, the terminal determines whether it travels in the region of the allocated paging group. The allocated paging group indicates the paging group corresponding to the paging listening interval confirmed in step 209, rather than all of the multiple paging groups allocated to the terminal.

If it is determined that the ID of the allocated paging group is contained, the terminal attempts to decode the paging message transmitted from the preferred base station and determines whether the decoding is successful in step 215. For instance, the success or failure of the decoding can be determined based on a Cyclic Redundancy Check (CRC). The paging message, which is the control message indicating whether the paging to the terminal exists, instructs a network re-entry or a location update. Herein, the network re-entry indicates an idle mode cancellation.

When the decoding of the paging message succeeds, the terminal determines whether the paging to the terminal exists in step 217. Namely, the terminal determines whether it is paged. For example, the paging is determined according to whether the paging message contains terminal ID information. Herein, the terminal ID information can be the deregistration ID in the paging information. That is, when the ID information of the terminal is contained, the terminal determines the presence of the paging.

If it is determined that the paging exists, the terminal re-enters the network or updates the location as instructed by the paging message in step 219. In a case of the network re-entry, the terminal transmits a ranging sequence and transmits the RNG-REQ message including a ranging purpose indication indicative of the network re-entry. In case of the location update, the terminal transmits the RNG-REQ message including a paging cycle change Type Length Value (TLV). In the location update, the terminal returns to step 203, which is not depicted in FIG. 2A.

When the ID of the allocated paging group is not contained in step 213, the terminal determines whether the number of the entries to the listening interval exceeds a maximum paging number in step 221. The maximum paging number is the number of the pagings allowed to the terminal within one cycle and is obtained from the paging information. In the multiple paging group allocation, the maximum paging number is smaller than or equal to the number of the allocated paging groups.

When the number of the entries to the listening interval falls below the maximum paging number, the terminal determines the paging listening interval of the next paging group in step 223. In more detail, the terminal determines the paging listening interval of the next paging group using the paging cycle, the paging offset of the initial paging group, the paging spacing, and the rank of the corresponding paging group. For example, the location of the paging listening interval of the next paging group is represented with the superframe number and determined based on Equation 3. Next, the terminal proceeds to step 209.

In contrast, when the number of the entries to the listening interval exceeds the maximum paging number, the terminal updates the location in step 225. To update the location, the terminal transmits the RNG-REQ message including the paging cycle change TLV and receives the RNG-RSP message including the paging information. Next, the terminal returns to step 203. That is, when the ID of the lowest-rank paging group is not contained in the paging group information, the terminal updates the location and returns to step 203. Alternatively, when all of the IDs of the allocated paging groups are not contained in the paging group information, the terminal can update the location and return to step 203.

When failing to decode the paging message in step 215, the terminal determines whether the number of the entries to the listening interval exceeds the maximum paging number in step 227. The maximum paging number is the number of the pagings permitted to the terminal within one cycle and is obtained from the paging information. In the multiple paging group allocation, the maximum paging number is smaller than or equal to the number of the allocated paging groups. When the number of the entries to the listening interval exceeds the maximum paging number, the terminal returns to step 207 to finish the paging check operation in the current paging cycle and determines the initial paging listening interval in the next paging cycle. In contrast, the number of the entries to the listening interval falls below the maximum paging number, the terminal determines the paging listening interval of the next paging group in step 223.

If it is determined that the paging type indicator indicates the single paging group allocation in step 205, the terminal determines the initial paging listening interval using the paging information in step 229. Herein, the initial paging listening interval indicates the 0-th paging listening interval of the single paging group. That is, the terminal determines the initial paging listening interval using the paging cycle and the paging offset of the initial paging group. For example, the location of the initial paging listening interval is represented as the superframe number and determined based on Equation 3.

In step 231, the terminal determines whether it enters the paging listening interval. More specifically, the terminal determines whether the current superframe number is equal to the superframe number corresponding to the paging listening interval determined in step 229 or step 245. Until entering the paging listening interval, the terminal minimizes the power consumption and performs no operation at all. Still, the terminal can scan its neighbor base stations or select the preferred base station.

Entering the paging listening interval, the terminal decodes the paging group information received from the base station in step 233. The paging group information, which informs of at least one paging group of the base station, is at the preset location in the superframe and includes at least one paging group ID. Accordingly, after obtaining the superframe synchronization, the terminal decodes the paging group information from the signal received over the preset location. By decoding the paging group information, the terminal can locate the current paging group.

In step 235, the terminal determines whether the ID of the paging group allocated to itself is contained in the paging group information. That is, the terminal determines whether it is in the region of the allocated paging group.

If it is determined that the ID of the allocated paging group is contained, the terminal attempts to decode the paging message transmitted from the preferred base station and determines whether the decoding is successful in step 237. For instance, the success or failure of the decoding can be determined based on the CRC. The paging message, which is the control message indicating whether the paging to the terminal exists, instructs the network re-entry or the location update. Herein, the network re-entry indicates the idle mode cancellation.

If it is determined that the decoding of the paging message succeeds, the terminal determines whether the paging to the terminal exists in step 239. Namely, the terminal determines whether it is paged. For example, the paging is determined according to whether the paging message includes the terminal ID information. Herein, the terminal ID information can be the deregistration ID in the paging information. That is, when the ID information of the terminal is contained, the terminal determines the presence of the paging.

If it is determined that the paging exists, the terminal re-enters the network or updates the location as instructed by the paging message in step 241. In case of the network re-entry, the terminal transmits the ranging sequence and transmits the RNG-REQ message including the ranging purpose indication indicative of the network re-entry. In case of the location update, the terminal transmits the RNG-REQ message including the paging cycle change TLV. In the location update, the terminal returns to step 203, which is not depicted in FIG. 2B.

If it is determined that the decoding of the paging message in step 237, the terminal determines whether the number of the entries to the listening interval exceeds the maximum paging number in step 243. The maximum paging number is the number of the pagings allowed to the terminal within one cycle and is obtained from the paging information.

When the number of the listening interval entries falls below the maximum paging number, the terminal determines the next paging listening interval in step 245. In more detail, the terminal determines the next paging listening interval using the location and the paging spacing of the preset paging listening interval. For example, the location of the next paging listening interval is represented with the superframe number and determined based on Equation 4. Next, the terminal proceeds to step 231.

In contrast, when the number of the listening interval entries exceeds the maximum paging number, the terminal updates the location in step 247. To update the location, the terminal transmits the RNG-REQ message including the paging cycle change TLV and receives the RNG-RSP message including the paging information. The terminal then returns to step 203. Alternatively, when the number of the listening interval entries exceeds the maximum paging number, the terminal can finish the paging determination operation in the current paging cycle in step 229 and determine the initial paging listening interval of the next paging cycle. If it is determined that the ID of the allocated paging group is not contained in step 235, the terminal proceeds to step 247.

Although not illustrated in FIGS. 2A and 2B, the terminal starts a preset timer after the paging cycle begins. The timer is used for a periodic location update. When the timer expires, the terminal can perform the location update regardless of the paging and the maximum paging number.

Figure 3:
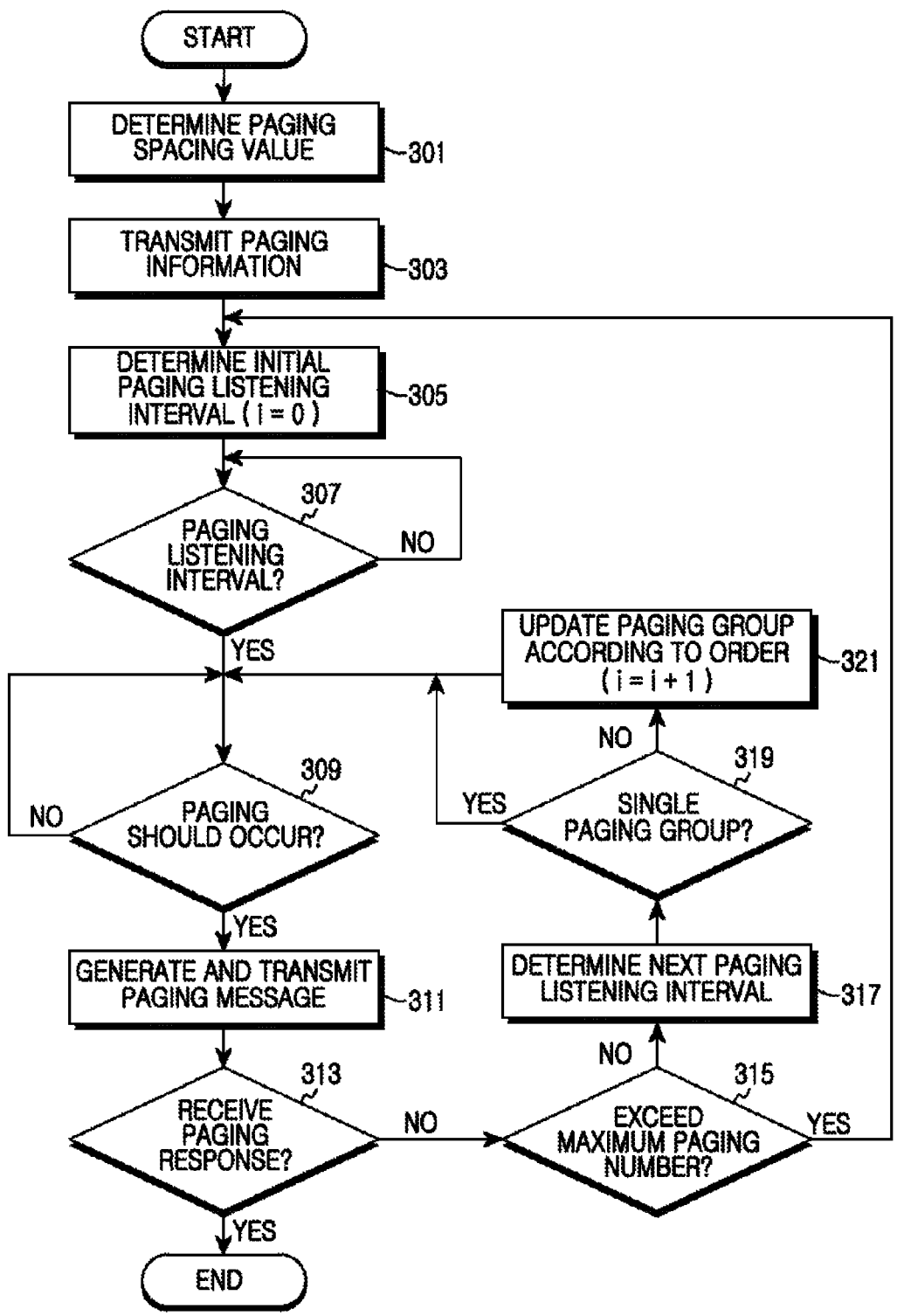
FIG. 3 illustrates operations of a paging control in a broadband wireless communication system according to an exemplary embodiment of the present invention.

FIG. 3 illustrates operations of a paging control in a broadband wireless communication system according to an exemplary embodiment of the present invention.

While FIG. 3 depicts the method for controlling the paging of the single terminal for convenience of understanding, the paging control may control the paging process of the multiple terminals at the same time. In this case, the method of FIG. 3 may be equally applied to each individual terminal.

Referring to FIG. 3, in step 301, the paging control determines a paging spacing value of the terminal. The paging spacing indicates an offset difference between adjacent pagings when the plurality of the pagings is conducted in one cycle. The paging spacing value can be determined through a capability negotiation procedure when the terminal enters a network. The paging control receives the request message including the intended paging spacing value of the terminal, and notifies the determined paging spacing value from the system using a response message. The paging spacing value can be modified through separate signaling after the network entry, which is not illustrated in FIG. 3.

In step 303, the paging control transmits the paging information. The paging information, which is control information used to determine a location of the paging listening interval in an idle mode, can be transmitted when the terminal enters the idle mode or when the terminal updates the location after entering the idle mode. Although not illustrated in FIG. 3, the paging control permits or instructs the entry to the idle mode of the terminal prior to step 303, or step 303 can be part of the process for permitting or instructing the entry to the idle mode of the terminal. Herein, the paging information can include the parameters as shown in Table 1. In addition, the paging information can include the paging spacing value.

The paging control determines an initial paging listening interval according to the paging information in step 305. Herein, in the multiple paging group allocation, the initial paging listening interval indicates the paging listening interval of a top-rank paging group. In the single paging group allocation, the initial paging listening interval indicates the 0-th paging listening interval of the single paging group. That is, the paging control determines the initial paging listening interval using the paging cycle in the paging information and the paging offset of the initial paging group. For example, the location of the initial paging listening interval is represented as a superframe number and determined based on Equation 3.

In step 307, the paging control determines whether the paging listening interval determined in step 305 or step 317 arrives. That is, the paging control determines whether the current superframe number is the same as the superframe number corresponding to the paging listening interval.

If it is determined that the paging listening interval arrives, the paging control determines whether the paging for the terminal should occur in step 309. The paging should occur when the downlink traffic of the terminal takes place, and when the location update of the terminal is needed. Namely, the paging control determines whether the downlink traffic of the terminal takes places or whether the location update of the terminal should occur. If it is determined that the paging does not have to occur, the paging control does not perform the paging over the current paging listening interval and proceeds to step 315.

In contrast, if it is determined that the paging should occur, the paging control generates and transmits the paging message including the paging for the terminal in step 311. The paging message, which is the control message indicating whether the paging to the terminal exists, instructs the network re-entry or the location update. Herein, the network re-entry indicates an idle mode cancellation. For example, the paging is represented to indicate whether the ID information of the terminal is contained. Herein, the ID information of the terminal can be the deregistration ID in the paging information. That is, the paging control generates and transmits the paging message including the ID information of the terminal and the information indicative of the paging type. Herein, the paging control forwards the paging message to the base stations belonging to the corresponding paging group, and transmits the paging message by instructing to transmit it.

In step 313, the paging control determines whether a paging response is received from the terminal. Herein, the paging response indicates a control signaling for the network re-entry or the location update instructed by the paging message. For example, the paging response is the RNG-REQ message including the paging cycle change TLV for the location update or the ranging sequence and the RNG-REQ message for the network re-entry. Upon receiving the paging response, the paging control ends the process.

If the paging response is not received, the paging control recognizes the paging failure and examines whether the number of the paging listening interval arrivals exceeds the maximum paging number in step 315. The maximum paging number is the number of the pagings permitted to the terminal within one cycle. In the multiple paging group allocation, the maximum paging number is smaller than or equal to the number of the allocated paging groups. When the number of the paging listening interval arrivals exceeds the maximum paging number, the paging control returns to step 305 and determines the initial paging listening interval of the next paging cycle.

In contrast, when the number of the paging listening interval arrivals falls below the maximum paging number, the paging control determines the next paging listening interval in step 317. The next paging listening interval indicates the next paging listening interval of the single paging group in a case of the single paging group allocation, and indicates the paging listening interval of the next paging group in a case of the multiple paging group allocation. For example, the next paging listening interval is determined based on Equation 4.

In step 319, the paging control determines whether the paging type of the terminal is the single paging group allocation or the multiple paging group allocation. If it is determined that the paging type of the terminal is the single paging group allocation, the paging control examines whether the next paging listening interval arrives in step 307 to retry the paging.

If it is determined that the paging type of the terminal is the multiple paging group allocation, the paging control updates the paging group according to a preset order in step 321. More specifically, the paging control sets the next paging group to the current paging group of the terminal according to a ranking between the multiple paging groups allocated to the terminal. Next, the paging control determines whether the paging listening interval of the next paging group arrives in step 307 to retry the paging.

Figure 4:
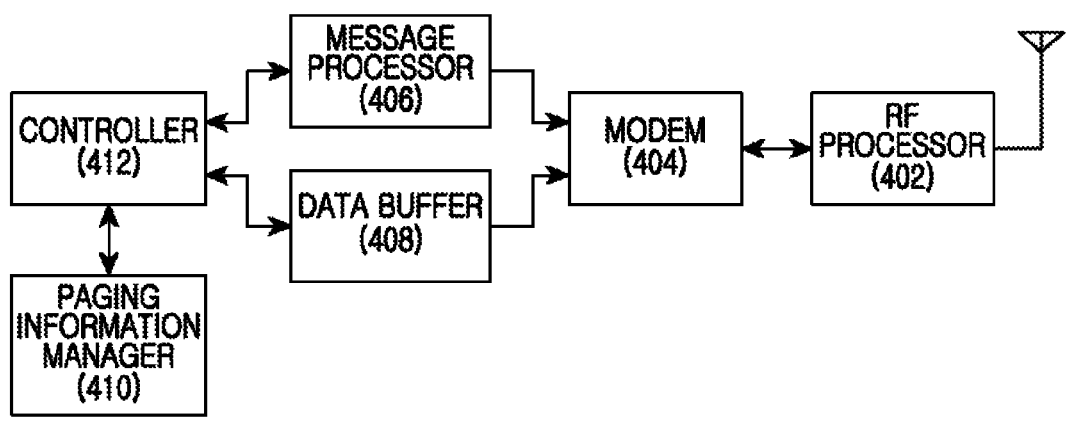
FIG. 4 illustrates a block diagram of a terminal in a broadband wireless communication system according to an exemplary embodiment of the present invention.

FIG. 4 illustrates a block diagram of a terminal in a broadband wireless communication system according to an exemplary embodiment of the present invention.

Referring to FIG. 4, the terminal includes a Radio Frequency (RF) processor 402, a modem 404, a message processor 406, a data buffer 408, a paging information manager 410, and a controller 412.

The RF processor 402 performs functions, such as signal band conversion and amplification, to transmit and receive signals over a radio channel. That is, the RF processor 402 up-converts a baseband signal output from the modem 404 to the RF signal and transmits the RF signal over an antenna, and down-converts the RF signal received over the antenna to the baseband signal.

The modem 404 converts the baseband signal and a bit string according to a physical layer standard of the system. For example, to transmit data, the modem 404 generates complex symbols by encoding and modulating the transmit bit string, maps the complex symbols to subcarriers, and constitutes OFDM symbols by applying Inverse Fast Fourier Transform (IFFT) and inserting a Cyclic Prefix (CP). When receiving data, the modem 404 splits the baseband signal output from the RF processor 402 to OFDM symbols, restores the signals mapped to the subcarriers using the FFT, and restores the receive bit string by decoding and demodulating the signals.

The message processor 406 generates and analyzes the message for the control signaling. In more detail, the message processor 406 generates the message including the information to transmit to a network entity such as a base station, and obtains the contained information by analyzing the message received from the network entity such as the base station. The data buffer 408 temporarily stores the transmitted and received data, and outputs the stored data under the control of the controller 412.

The paging information manager 410 stores and manages parameter set values relating to the paging. For instance, the parameters relating to the paging include a paging spacing, a paging cycle length, an initial paging offset, a paging type, a maximum paging number, a deregistration ID, and a paging group ID. The paging information manager 410 stores the ID information of at least one paging group allocated to the terminal, and the ranking information between the allocated paging groups. The paging information manager 410 stores the preferred base station information in an idle mode.

The controller 412 controls functions of the terminal. For example, the controller 412 provides the information used for the control signaling to the message processor 406, and receives the information obtained through the control signaling. The controller 412 controls the operation mode of the terminal according to traffic status and power status of the terminal. In the idle mode, the controller 412 receives the paging message over the paging listening interval and controls to minimize the power consumption in the paging unavailable interval. More specifically, in the idle mode, the controller 412 controls to determine the paging according to the paging information provided from the paging control. The operations of the controller 412 for determining the paging are described in more detail below.

The controller 412 determines the paging interval value. When the plurality of the pagings is performed in one cycle, the paging interval indicates an offset difference between adjacent pagings. The paging spacing value can be determined through capability negotiation procedure in a network entry of the terminal or through separate signaling after the network entry. The controller 412 receives the paging information from the paging control and provides the paging information to the paging information manager 410. The paging information may be received in an idle mode entry or in a location update after the idle mode entry.

Based on the paging type indicator in the paging information, the controller 412 determines whether the paging type is a multiple paging group allocation or a single paging group allocation. The multiple paging group allocation carries out multiple pagings through a plurality of the paging groups, and a single paging group allocation carries out the multiple pagings or the single paging through one paging group.

If it is determined that the paging type is the multiple paging group allocation, the controller 412 confirms the allocated multiple paging groups and sequentially determines the paging according to the rankings of the allocated paging groups. The controller 412 determines the location of the paging listening interval of the initial paging group using the paging cycle length and the initial paging group offset, and determines the location of the paging listening interval of the other paging groups using the paging cycle length, the initial paging group offset, and the paging spacing. For instance, the location of the paging listening interval is determined based on Equation 3. Within one paging cycle, the paging check through the lower rank paging group is conducted when the decoding of the paging message transmitted through the high rank paging group fails or when the terminal does not travel in a region of the high rank paging group. When the decoding of the paging message of all of the paging groups fails, the controller 412 finishes the paging determination in the current paging cycle and determines the paging in the next paging cycle. When the terminal strays from the region of the lowest rank paging group or when the terminal strays from the regions of all of the allocated paging groups, the controller 412 updates the location.

If it is determined that the paging type is the single paging group allocation, the controller 412 confirms the single paging group allocated and determines whether the paging is conducted as many as the maximum paging number of the paging information during one paging cycle. The controller 412 determines the location of the paging listening interval of the initial paging group using the paging cycle length and the initial paging group offset, and determines the location of the paging listening interval of the other paging groups using the location of a previous paging listening interval and the paging spacing. For example, the location of the paging listening interval is determined based on Equation 3 and Equation 4. Within one paging cycle, the paging check in the latter paging listening interval is performed when the decoding of the transmitted paging message fails in the former paging listening interval. When the decoding of the paging message in the paging listening interval of every rank fails r when the terminal strays from the region of the allocated paging group, the controller 412 updates the location. Alternatively, when the decoding of the paging message in the paging listening interval of every rank fails, the controller 412 finishes the paging determination operation in the current paging cycle and then determines the paging in the next paging cycle.

Regardless of the paging type, the controller 412 starts the preset timer after the initial paging cycle begins. The timer is used for a periodic location update. When the timer expires, the controller 412 updates the location regardless of the paging and the maximum paging number.

Figure 5:
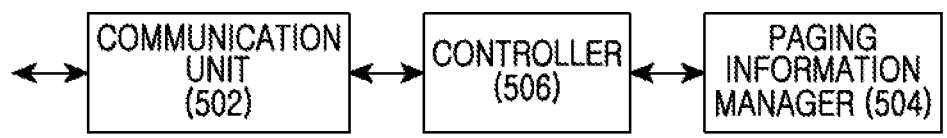
FIG. 5 illustrates a block diagram of a paging control in a broadband wireless communication system according to an exemplary embodiment of the present invention.

FIG. 5 is a block diagram of a paging control in a broadband wireless communication system according to an exemplary embodiment of the present invention.

Referring to FIG. 5, the paging control includes a communication unit 502, a paging information manager 504, and a controller 506.

The communication unit 502 provides an interface for the paging controller to communicate with other network entities. The communication unit 502 converts a bit string transmitted by the paging control to a physical signal, and converts the physical signal received at the paging control to the bit string.

The paging information manager 504 stores and manages parameter set values relating to the paging of each terminal. For example, the parameters relating to the paging include a paging spacing, a paging cycle length, an initial paging offset, a paging type, a maximum paging number, a deregistration ID, and a paging group ID. The paging information manager 504 stores the ID information of at least one paging group allocated to each terminal, and the ranking information between the allocated paging groups.

The controller 506 controls the functions of the paging control. More specifically, the controller 506 controls to page the terminal. The controller 506 determines the paging spacing value. The paging spacing indicates an offset difference between adjacent pagings when a plurality of the pagings is conducted in one cycle. The paging spacing value can be determined through the capability negotiation procedure in the network entry of the terminal or through the separate signaling after the network entry. The controller 412 determines the paging type of the terminal, allocates the paging group and the deregistration ID to the terminal, determines rankings between the paging groups, and determines maximum paging number. The controller 506 controls to transmit the paging information to the terminal. For example, the paging information includes the parameters of Table 1. The paging information may be transmitted in an idle mode entry or in a location update after the idle mode entry.

After the paging information is transmitted, when downlink traffic of the terminal takes places or when the location update of the terminal should occur, the controller 506 pages the terminal over one or multiple paging listening intervals within the paging cycle. In so doing, the latter paging listening intervals are used when a response of the paging over the former paging listening interval is not received. That is, upon or after determining the appropriate paging, the controller 506 fulfills the paging over the present paging listening interval. If the response for the paging is not received, the controller 506 determines the next paging listening interval within the range not exceeding the maximum paging number per paging cycle, and repeats the paging over the next paging listening interval. In so doing, the controller 506 determines the next paging listening interval using the location of the previous paging listening interval and the paging spacing. If it is determined that the paging type is a single paging group allocation, the controller 506 employs the single paging group without change. If it is determined that the paging type is a multiple paging group allocation, the controller 506 updates the paging group of the terminal in the preset order per paging.

By fulfilling multiple pagings within one paging cycle in a broadband wireless communication system, excessive paging delays can be avoided even when the paging cycle extends. Further, implicit paging offset determination to determine a paging listening interval can reduce a message overhead in the paging information delivery.

While the present disclosure has been shown and described with reference to certain exemplary embodiments thereof, it will be understood by those skilled in the art that various changes in form and details may be made therein without departing from the scope of the invention as defined by the appended claims and their equivalents.

What is claimed is:

1. A method for operating a terminal in a wireless communication system, the method comprising:

receiving, from a base station (BS), information for indicating that a paging signal is transmitted more than one time in a paging cycle;

receiving, from the BS, a first paging signal in a first listening interval of the paging cycle based on the received information; and receiving, from the BS, a second paging signal in a second listening interval of the same paging cycle.

2. The method of claim 1, wherein the receiving of the second paging signal comprises:

receiving, upon determining that decoding the first paging signal is failed, the second paging signal in the same the paging cycle.

3. The method of claim 1, wherein the receiving of the second paging signal comprises:

receiving, upon determining that decoding of the first paging signal has failed and a number of entries to intervals during the paging cycle does not exceed a maximum paging number, the second paging signal in the second listening interval of the same paging cycle.

4. The method of claim 1, wherein the receiving of the second paging signal comprises:

receiving, upon determining that the paging group is not allocated to the terminal, the second paging signal in the second listening interval of the same paging cycle.

5. The method of claim 1, wherein the receiving of the second paging signal comprises:

receiving, upon determining that the paging group is allocated to the terminal and a number of entries to intervals during the paging cycle does not exceed a maximum paging number, the second paging signal in the second listening interval of the same paging cycle.

6. The method of claim 1, further comprising:

receiving second information indicating locations of the first interval of the paging cycle and the second interval of the paging cycle.

7. The method of claim 6, wherein the second information comprises an offset indicating at least one of a start of the first interval using a start point of the paging cycle and a gap between the first interval and the second interval.

8. The method of claim 1, further comprising:

receiving third information indicating whether a single paging group is allocated or multiple paging groups are allocated to the terminal.

9. The method of claim 1, further comprising:

receiving fourth information comprising information on at least one paging group allocated to the terminal.

10. The method of claim 9, wherein the fourth information comprises at least one identifier of paging group allocated to the terminal, further comprising:

receiving information on a first paging group at the first interval of the paging cycle, and determining whether the paging group is allocated to the terminal based on the at least one identifier.

11. The method of claim 1, further comprising:

determining that the terminal is paged at the second interval of the paging cycle.

12. The method of claim 1, further comprising:

receiving information on a gap between a first interval of the paging cycle and a second interval of the paging cycle during a capability negotiation procedure.

13. A method for operating a paging processor in a wireless communication system, the method comprising:

transmitting, to a terminal, information for indicating that a paging signal is transmitted more than one time in a paging cycle;

transmitting, to the terminal, a first paging signal in a first listening interval of the paging cycle based on the information; and transmitting, to the terminal, a second paging signal in a second listening interval of the same paging cycle.

14. The method of claim 13, wherein the transmitting of the second paging signal comprises:

transmitting, upon determining that a paging response is not received from the terminal, the second paging signal in the second listening interval of the same paging cycle.

15. The method of claim 13, wherein the transmitting of the second paging signal comprises:

transmitting, upon determining that a paging response is not received from the terminal and a number of paging signal transmissions during the paging cycle does not exceed a maximum paging number for the terminal, the second paging signal in the second listening interval of the same paging cycle.

16. The method of claim 13, further comprising:

transmitting second information indicating locations of the first interval of the paging cycle and the second interval of the paging cycle.

17. The method of claim 16, wherein the second information comprises an offset indicating at least one of a start of the first interval using a start point of the paging cycle and a gap between the first interval and the second interval.

18. The method of claim 16, further comprising:

transmitting third information indicating whether a single paging group is allocated or multiple paging groups are allocated to a terminal.

19. The method of claim 16, further comprising:

transmitting fourth information comprising information on at least one paging group allocated to a terminal.

20. The method of claim 19, wherein the fourth information comprises at least one identifier of paging group allocated to the terminal.

21. The method of claim 16, further comprising:

transmitting information on a gap between the first interval of the paging cycle and the second interval of the paging cycle during a capability negotiation procedure.

22. An apparatus for operating a terminal in a wireless communication system, the apparatus comprising:

a transceiver; and a processor, operatively coupled to the transceiver, wherein the processor is configured to:

receive, from a base station (BS), information for indicating that a paging signal is transmitted more than one time in a paging cycle, receive, from the BS, a first paging signal in a first listening interval of the paging cycle based on the received information, and receive, from the BS, a second paging signal in a second listening interval of the same paging cycle.

23. The apparatus of claim 22, wherein the processor is further configured to:

receive, upon determining that decoding the first paging signal is failed, the second paging signal in the second interval of the same paging cycle.

24. The apparatus of claim 22, wherein the processor is further configured to:

receive, upon determining that decoding the first paging signal is failed and a number of entries to intervals during the paging cycle does not exceed a maximum paging number, the second paging signal in the second listening interval of the same paging cycle.

25. The apparatus of claim 22, wherein the processor is further configured to:

receive information for a paging group in the paging cycle.

26. The apparatus of claim 25, wherein the processor is further configured to:

receive, upon determining that the paging group is not allocated to the terminal, the second paging signal in the same paging cycle.

27. The apparatus of claim 22, wherein the processor is further configured to:

receive, upon determining that a paging group is allocated to the terminal and a number of entries to intervals during the paging cycle does not exceed a maximum paging number, the second paging signal in the same paging cycle.

28. The apparatus of claim 22, wherein the processor is further configured to:

receive second information indicating locations of the first interval of the paging cycle and the second interval of the paging cycle.

29. The apparatus of claim 28, wherein the second information comprises an offset indicating at least one of a start of the first interval using a start point of the paging cycle and a gap between the first interval and the second interval.

30. The apparatus of claim 22, wherein the processor is further configured to:

receive third information indicating whether a single paging group is allocated or multiple paging groups are allocated to the terminal.

31. The apparatus of claim 22, wherein the processor is further configured to:

receive fourth information comprising information on at least one paging group allocated to the terminal.

32. The apparatus of claim 31, wherein the fourth information comprises at least one identifier of paging group allocated to the terminal, and wherein the processor is further configured to:

receive information on a first paging group at the first interval of the paging cycle, and determine whether the paging group is allocated to the terminal based on the at least one identifier.

33. The apparatus of claim 22, wherein the processor is further configured to:

determine that the terminal is paged at the second interval of the paging cycle.

34. The apparatus of claim 22, wherein the processor is further configured to:

receive information on a gap between the first interval of the paging cycle and the second interval of the paging cycle during a capability negotiation procedure.

35. An apparatus for operating a paging processor in a wireless communication system, the apparatus comprising:

a transceiver; and a processor operatively coupled to the transceiver, wherein the processor is configured to:

transmit, to a terminal, information for indicating that a paging signal is transmitted more than one time in a paging cycle, transmit, to the terminal, a first paging signal in a first listening interval of the paging cycle based on the information, and transmit, to the terminal, a second paging signal in a second listening interval of the same paging cycle.

36. The apparatus of claim 35, wherein the processor is further configured to:

transmit, upon determining that a paging response is not received from the terminal, the second paging signal in the second listening interval of the same paging cycle.

37. The apparatus of claim 35, wherein the processor is further configured to:
transmit, upon determining that a paging response is not received from the terminal and a number of paging signal transmissions during the paging cycle does not exceed a maximum paging number for the terminal, the second paging signal in the second listening interval of the same paging cycle.

38. The apparatus of claim 35, wherein the processor is further configured to:
transmit second information indicating locations of the first interval of the paging cycle and the second interval of the paging cycle.

39. The apparatus of claim 38, wherein the second information comprises an offset indicating at least one of a start of the first interval using a start point of the paging cycle and a gap between the first interval and the second interval.

40. The apparatus of claim 35, wherein the processor is further configured to:
transmit third information indicating whether a single paging group is allocated or multiple paging groups are allocated to the terminal.

41. The apparatus of claim 35, wherein the processor is further configured to:
transmit fourth information comprising information on at least one paging group allocated to a terminal.

42. The apparatus of claim 41, wherein the fourth information comprises at least one identifier of paging group allocated to the terminal.

43. The apparatus of claim 35, wherein the processor is further configured to:
transmit information on a gap between the first interval of the paging cycle and the second interval of the paging cycle during a capability negotiation procedure.

* * * * *